(12) United States Patent
Claessens

(10) Patent No.: US 6,567,569 B1
(45) Date of Patent: May 20, 2003

(54) METHOD FOR DETERMINING REPRODUCIBLY IF VISUAL FEATURES OF OBJECTS ARE KNOWN TO A PERSON

(75) Inventor: Dominique Paul Gerard Claessens, Curacao (AN)

(73) Assignee: Verify International N.V., Curacao (AN)

( * ) Notice: Subject to any disclaimer, the term of this patent is extended or adjusted under 35 U.S.C. 154(b) by 0 days.

(21) Appl. No.: 09/308,567

(22) PCT Filed: Nov. 21, 1997

(86) PCT No.: PCT/NL97/00638

§ 371 (c)(1),
(2), (4) Date: Aug. 12, 1999

(87) PCT Pub. No.: WO98/22900

PCT Pub. Date: May 28, 1998

(30) Foreign Application Priority Data

Nov. 22, 1996 (NL) .............................................. 1004598

(51) Int. Cl.⁷ ............................ G06K 9/36; G06K 9/46; H04N 17/02; G09G 5/00; G06F 17/60
(52) U.S. Cl. ...................... 382/311; 382/284; 382/282; 382/190; 348/180; 345/729; 705/10
(58) Field of Search ................................. 382/182, 190, 382/191, 274, 277, 278, 282, 284, 287, 291, 293, 294, 295, 299, 302, 311; 345/156, 173, 700, 729, 733; 348/180, 189, 191; 705/10; 725/35, 36

(56) References Cited

U.S. PATENT DOCUMENTS 5,436,830 A * 7/1995 Zaltman ..................... 707/530
5,515,098 A * 5/1996 Carles ......................... 725/35
5,636,346 A * 6/1997 Saxe .............................. 705/1
5,848,396 A * 12/1998 Gerace .......................... 705/10

OTHER PUBLICATIONS

By A.J. O'Toole et al., "A Physical System Approach to Recognition Memory for Spatially Transformed Faces", *Neural Networks*, vol. 1, No. 3, 1988, pp. 179–199.

By M. Gross, "Image Analysis for Advertisement Purposes: A Computational Model of Visual Perception", *Computers & Graphics*, vol. 16, No. 2, 1992, pp. 213–221.

By L.M. Kilbourne et al., "The Effect of Information Diagnosticity and Clarity in Image Ads on Judgments About the Company", *Proceedings Decision Sciences Institute*, 1994, pp. 478–480.

* cited by examiner

*Primary Examiner*—Jayanti K. Patel
*Assistant Examiner*—Yosef Kassa
(74) *Attorney, Agent, or Firm*—Young & Thompson

(57) ABSTRACT

A method for determining reproducibly if visual features of an object are known to a person. For that purpose, one or more test images are prepared by applying predetermined algorithms so that an image of the respective object is altered such that cognitive perception is in general impossible whereas the global affective impression is not influenced. The test images are presented to a person and it is determined if recognition occurs and if so how certain and how correct. Finally, it is determined which parts of the original images can be reproduced based on information recalled from the memory and if there is confusion or interchange with other images.

6 Claims, 4 Drawing Sheets

Brengt de gezondheid ernstige schade toe, k.b. 4.10.1994, Stb. 720.

METHOD FOR DETERMINING REPRODUCIBLY IF VISUAL FEATURES OF OBJECTS ARE KNOWN TO A PERSON

AREA OF THE INVENTION

The invention relates in general to a method for determining reproducibly if visual features of objects are known to a person. More specifically the invention relates to methods for determining for instance which percentage of a specific group of consumers has knowledge of or is acquainted with specific brands, advertisements, packings, products, persons, art, models (for instance of automobiles), designs, shopping formulae, newspapers, magazines, etc. Furthermore, the invention relates to methods for determining if the above-mentioned familiarity or acquaintance differs dependent on the selected group of people, dependent on the type of human being, dependent on place of living or country, dependent on language, etc.

STATE OF THE ART

To be able to determine if a test person has knowledge of the visual appearance of certain brands, advertisements, packings, etc. it is known to show certain brands, advertisements, packings, or other visually observable objects to a test person and ask the test person if he knows the objects. The researcher receives an answer but does not know for sure if the answer is true. Practice has proven that test persons, because they are afraid of being considered ignorant, sometimes will provide answers which are not in correspondence with the truth. That will make such a research unreliable of course.

Amongst others advertisers therefore have a large need to obtain reliable information about the impact of an advertisement, a special offer or a commercial on the observer thereof.

OBJECT OF THE INVENTION

An object of the invention is now to fulfil the above indicated need and to provide a method for determining if visual features of objects are known by a person, which method cannot or hardly be influenced by the test person on the basis of pretended ignorance, shyness, etc. and which provides reliable reproducible results.

SHORT SPECIFICATION OF THE INVENTION

In agreement with said object the invention now provides a method for determining reproducibly if visual features of an object are known by a person, which method comprises the following steps a) preparing one or more test images by applying predetermined algorithms by means of which an image of the respective object is altered such that cognitive perception is in general impossible whereas the global affective impression is not influenced, b) presenting the test images to a person, c) determining if the images are recognized and, if so, how certain and how correct, d) determining which parts of the original images can be reproduced based on information recalled from the human memory and determining if there is confusion or interchange with other images.

The invention relies on the understanding that a large part of the image information which is observed daily by a human being is not stored in the human memory such that it can be recalled and used at a later moment. However, the intention of the advertiser is to present information in the form of visually observable stimuli, for instance embodied as advertisements, billboards, and television commercials, such that the presented information can be stored in the memory of the human observer so that familiarity may be assumed.

The invention now fulfils this need by means of a method for measuring how much of an individual stimulus is memorized, stored, can be recalled and can be used.

The fact that from the large number of visually observable objects with which a person will be confronted, only a restricted part is stored in the person's memory, is amongst others related to the manner in which the human visual senses are functioning. In the eye, impinging light will through the cornea and the eye lens reach the retina where the therein present sensors will convert the light into signals which are transferred to the brains and to the memory. The central section of the retina, the fovea centralis, which is located near the optical axis of the eye, has a relatively large number of sensors. With growing distance from the optical axis (fovea centralis or eye centre) the number of sensors and therewith the number of connections with the brains and the memory, diminishes (retina).

The retina occupies a much larger surface than the fovea centralis and has a transfer function for the overall observation and for selecting parts thereof, for whatever reason, on which the eye centre can be aligned.

Image information, observed in high resolution through sensors of the fovea centralis, can be processed by the brains and can be stored as cognitive information in the memory.

By presenting images of which the information contents corresponds with the information contents of an image which was observed "from the corner of the eye", which cannot be recognized cognitively, it can be determined if the test person retrieves sufficient global information from the image to obtain an association with an image stored in his or her memory enabling on the basis thereof a decision how much, and which part of the original image was put in the memory, was stored, can be retrieved and can be reused.

The cognitively received image with high resolution can be memorized. Without foreknowledge an affectively received image with low resolution cannot be supplemented with cognitive characteristics. However, supplementing is possible if there is preknowledge and then a low resolution image can be sufficient to trigger the recognition process into details. The fact that recognition is obtained proves that there was foreknowledge. Without foreknowledge the low resolution image is "not readable".

FURTHER APPLICATIONS OF THE INVENTION

The invention is not restricted to a method for determining if visual characteristics of a certain object are known to a person. The invention can be used furthermore to determine if the visual impression of two (or more) objects is more or less equal. If test images are made in the above-indicated manner of two resembling objects, then one could determine on the basis of these test images if confusion or interchanging will be created and at what percentage of the test persons this occurs. Such an embodiment of the method can be applied for instance to prove in trademark disputes, copy right disputes and design disputes whether or not industrial property rights or other forms of property rights are infringed.

Also within the scope of the invention is a method which enables in an early stage of the design process, for instance the process of designing a new packing, the process of designing a new car model, the process of designing a new logo, etc., to determine which images, or parts thereof, which are stored in the memory, can be recalled by a test person on the basis of association.

DETAIL CHARACTERISTICS OF THE INVENTION

During the step indicated by a) of the method, preferably use is made of algorithms for relocating array elements (squares or other shapes, for instance interconnected shapes with varying extent). By means of the algorithms all conceivable kinds of relocations, both in volume as well as in direction can be realized. However, only those combinations are applied whereby the altered image fulfils the defined requirements.

The algorithms are based on the determination of array formats and the relocation per array element. For instance, an image can be divided in a larger or smaller number of array elements. There are images which on the basis of only a small visible detail are directly recognizable. There are also images with image elements which are so large that a small array format does cause insufficient alternations. In that case the use of more arrays in different dimensions could solve the problem.

The array formats per image and the algorithms are such that the cognitive characteristics, which relate to larger shapes and those, which relate to smaller shapes and details, are stripped off. The result thereof is that the cognitive features can be stripped of each image in the same way and to the same extent irrespective of the dimensions of the image sections.

By applying the algorithms no image information is lost in fact. By relocating array elements the cognitive features are removed but the affective impression is not changed. The elements themselves are not changed. The global impression of the altered image is in general equal to the retinal reception of the original image.

The algorithms are reproducible up to the individual array elements. That means that an array element having a predetermined original position in the image will be relocated to one and the same further position if the algorithms are applied. That is true for each separate array element. That implies, that the original images can be processed by means of one or more algorithms resulting always in images which are altered in the same way, irrespective of the lapsed intermediate time.

Within the scope of the invention a further alteration of the image can be obtained by removing the colour from a number of array elements, selected by the algorithms, maintaining, however, the shape, or to remove the shape and maintaining the colour, or to remove both shape and colour, or a combination of the afore-mentioned possibilities. In case the colour of array elements is removed the original colour could be replaced by one smooth colour. The replaced colour could have a neutral character or could correspond with a colour which is present in the original image. If shape and colour are removed from the array elements then it is for instance possible to replace the original elements by strange elements, etc.

As such a number of methods for changing image information are known, for instance for making certain parts of a television image "not recognizable". In some cases it is for instance not desirable that certain persons, objects or situations can be recognized and in those case the image can be locally fainted. The methods which are applied in that relation result, however, in a strong distortion because the colour and/or colour saturation and/or luminance and/or contrast of the altered image defer from those of the original image. These methods not only have influence on the receptability of the cognitive features but also change the global affective impression of the image. Known are for instance methods whereby part of the image is distorted until a more or less rude "pattern of squares". This can be obtained for instance by assigning a colour, luminance, or saturation value to each square, which is the average of the respective values of the original pixels in the square. Average values, however, could lead to undesirable effects because the average of a shape is a different shape and the average of multiple colours is another colour. The average of red, green, and blue could be white or black. The average of red and white results into pink, a colour which is for instance not present in the original image.

For performing the second step of the method, indicated by b), use can be made all conceivable presentation devices, for instance a display screen or projection screen on which the altered images can be made visible during a predetermined time period. As an alternative use can be made of paper, etc.

With reference to step c) of the method it will be clear that there is a relation between the extent and the type of knowledge which the person has of the original image, the extent of the alternation in step a), and the ability to recall and use information which is stored in the memory.

If, in case of confrontation with a visual object, information is memorized then, if the altered image is presented, recognition may occur. That is even possible in case the presented image is altered strongly in relation to the original image. However, if at the first confrontation with a visual object no information was memorized, then recognition is impossible if the altered image is presented.

As already remarked according to the method of the invention altered images can be used to determine if certain visual objects are known with people and to determine which and how many details are memorized of the many visual objects one is confronted with daily, such as advertisements, billboards, television commercials, brands, products, packings, certain persons, securities, cars, design, art, etc. If a person is able to recall as a whole or in part an original image from its memory on the basis of the altered memory then that proves that the original image was memorized before, was stored, could be recalled and could be reused.

DETAILED DESCRIPTION OF THE INVENTION

In the following first of all it will be explained in detail in which manner the test images according to step a) of the invention are prepared by transforming the original images according to an algorithm into test images, such that the cognitive reception is in general impossible, whereas the global affective impression is not influenced.

The applied transformation has the feature that the relocated image elements or group of image elements do not cover each other, are not duplicated or leave an open space. Also due that feature the total impression of the original image is contained whereas the relation between the parts thereof is lost.

The transformation can be mathematical represented by:

$$D(x',y') = \psi(x,y) E(x,y)$$

in which:

E(x,y) is an image element or a group of image elements at position (x,y) in the original image.

ψ(x,y) is the transformation function ψ which assigns a relocated position (x,y) to an original image position (x',y').

D(x',y') is a relocated image element (or group of image elements) relocate from the original position (x,y) to the position (x',y').

Example of Preparing a Test Image

For a better understanding a low resolution image is taken comprising only 4×4=16 image elements.

The image contents of each of the elements, for instance colour, luminance, saturation, etc., is in this-example combined into one numerical value. The image can be represented by numerals and could look as follows:

$$y \begin{bmatrix} 0 & 0 & 11 & 30 \\ 10 & 42 & 63 & 47 \\ 24 & 35 & 51 & 73 \\ 37 & 0 & 80 & 92 \end{bmatrix} \longrightarrow x$$

In this example the picture elements E(x,y) will have the following values:

E(1,1)=37
E(2,1)=0
E(1,2)=24
E(2,2)=35
etc.

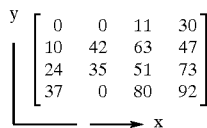

If the separate image elements are processed by the transformation function ψ the result will be:

$$\psi(1,1) E(1,1) = D(1,2)$$

i.e.: E(1,1)=37 is relocated to position (1,2)

$$\psi(2,1) E(2,1) = D(3,1)$$

i.e.: E(2,1)=0 is relocated to position (3,1)

$$\psi(1,2) E(1,2) = D(1,3)$$

i.e.: E(1,2)=24 is relocated to position (1,3)

$$\psi(2,2) E(2,2) = D(3,2)$$

i.e.: E(2,2)=35 is relocated to position (3,2) etc.

The resulting transformed image will be:

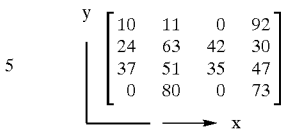

It is possible to apply the transformation function ψ repetitively on the whole image or sections thereof.

It is also possible to apply different definitions of ψ depending on the position (x,y). Therewith the function ψ can be written as $\psi_{(x,y)}(x,y)$.

The format of the pixels could be different for each operation.

Because of its definition ψ contains also process steps such as rotating, mirroring, interchanging picture elements or groups of picture elements, etc.

SHORT DESCRIPTION OF THE FIGURES

The invention will be explained in more detail with reference to the attached drawings.

FIG. 3 illustrates an original advertisement image related to Marlboro cigarettes.

FIG. 4 illustrates a test image made in agreement with the invention.

FIG. 1 illustrates an advertisement image as can be found for instance in magazines, papers, and other media. The picture information can be observed in full resolution, can be processed cognitively by the brains and can be memorized as information in the memory.

Figure 2:
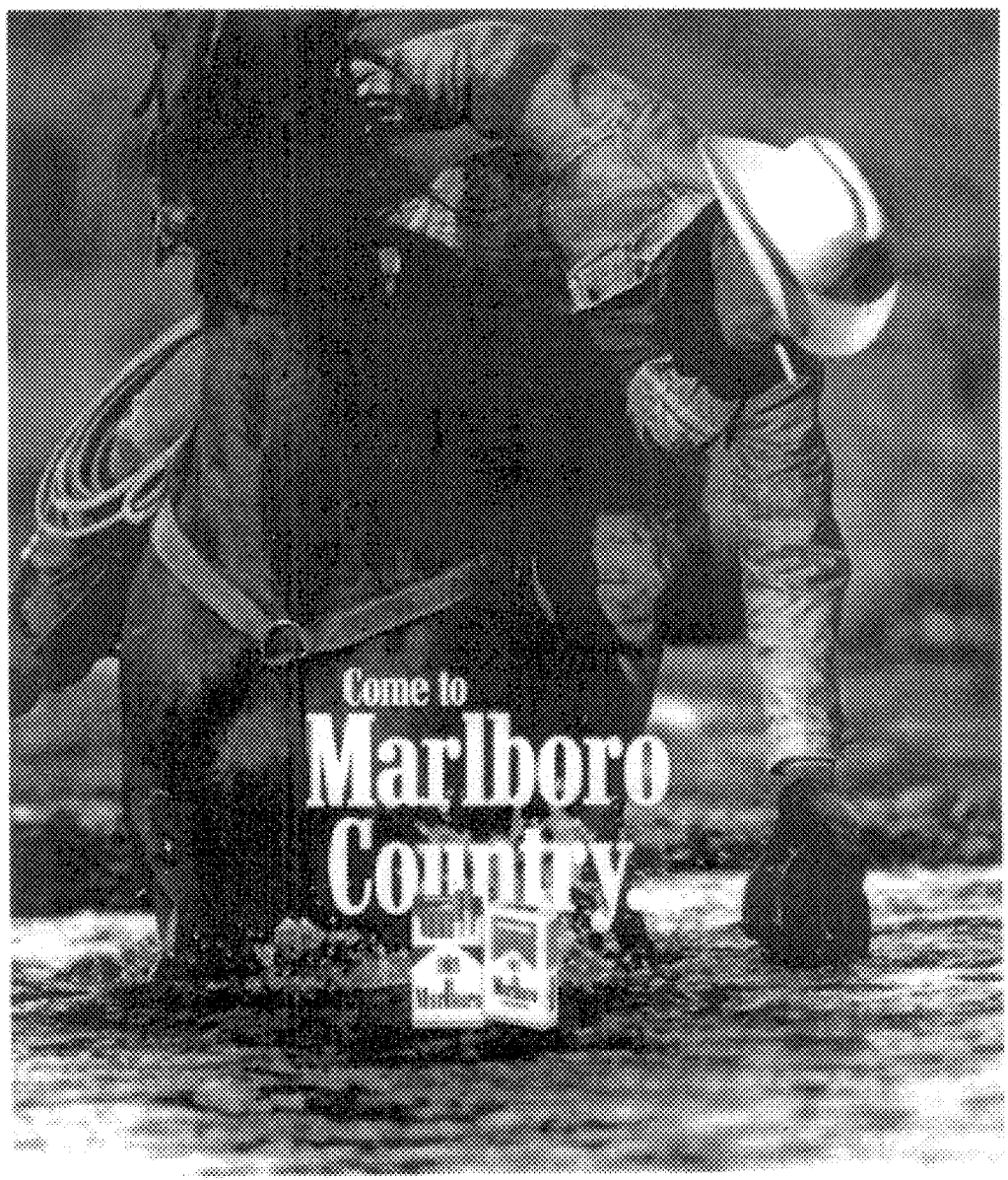
FIG. 2 illustrates a test image made in agreement with the invention.
Figure 2A:

FIG. 2 illustrates a test image which is made in agreement with the invention and which cannot be perceived with cognitive abilities. Therewith this low resolution image is "not readable" and can only be supplemented with cognitive features such that recognition may occur if there is knowledge present in the memory. In case recognition occurs, that will prove that there was foreknowledge.

Figure 1:
FIG. 1 illustrates an original advertisement image related to Nivea Creme.
Figure 1A:
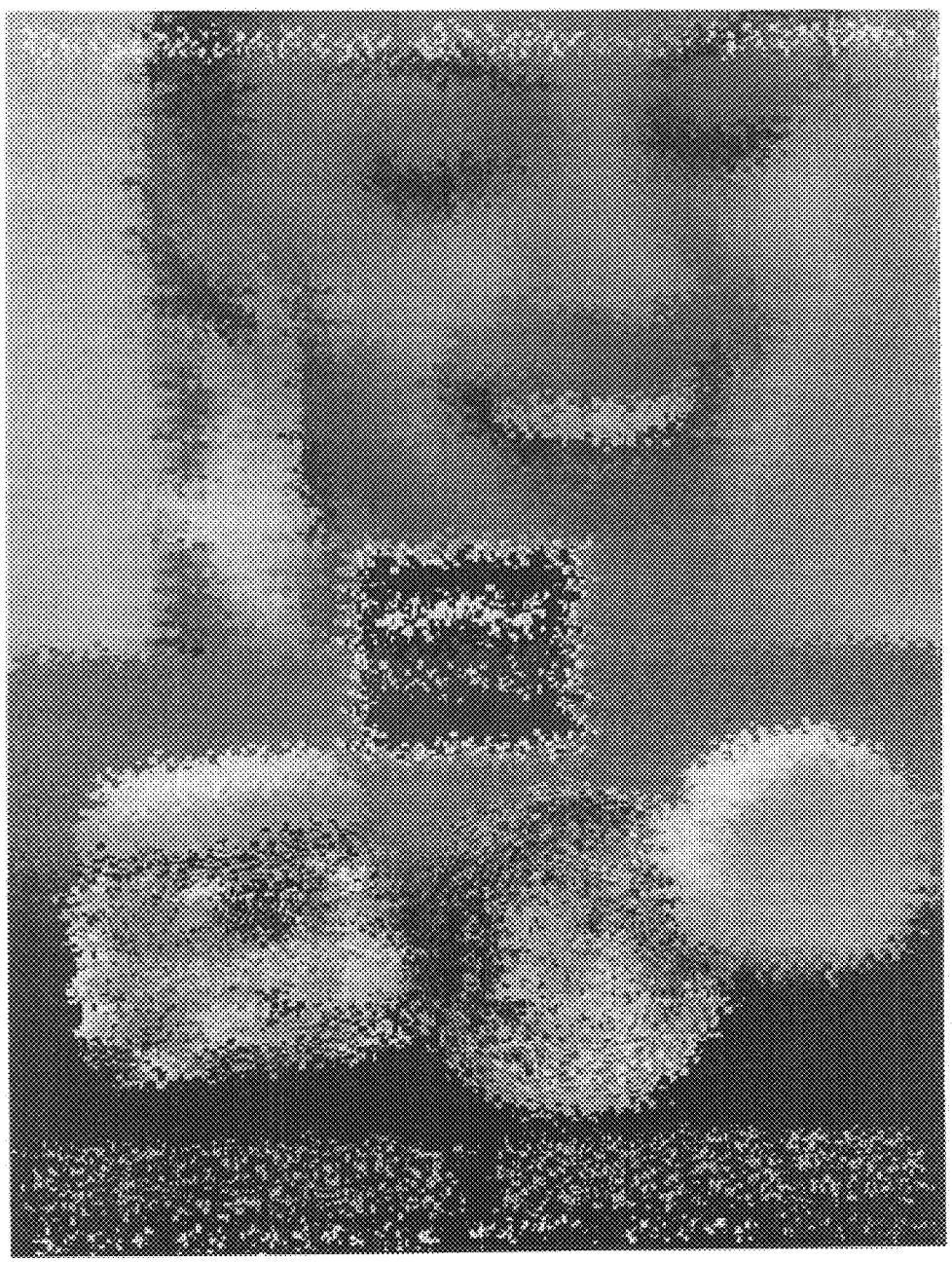

As is explained in detail above the image in FIG. 2 is obtained from the image in FIG. 1 by one or more applications of an algorithm on the whole image or sections thereof, such that unique relocations of image elements or groups of image elements are obtained.

FIG. 3 illustrates also an advertisement image as for instance can be found into magazines, papers, and other media. The picture information can be observed in full resolution, can be processed cognitively by the brains and can be memorized as information in the memory.

FIG. 4 illustrates a test image which is made in agreement with the invention and which cannot be perceived with cognitive abilities. Therewith this low resolution image is "not readable" and can only be supplemented with cognitive features such that recognition may occur if there is knowledge present in the memory. In case recognition occurs, that will prove that there was foreknowledge.

As is explained in detail above the image in FIG. 4 is obtained from the image in FIG. 3 by one or more applications of an algorithm on the whole image or sections thereof, such that unique relocations of image elements or groups of image elements are obtained.

What is claimed is:

1. Method for determining reproducibly if visual features of an image are known to a person, which method comprises the following steps:
   a) preparing a test image by applying a method for transforming images into test images by relocating image elements or groups of image elements by applying a n×m dimensional image element position transfer function $\psi^{n,m}(x,y)$ on n×m sections of test images, such that the relocated image elements or groups of image elements never cover each other, do not duplicate each other, do not leave an open space and remain unchanged in respect to color, color saturation and brightness,
   b) presenting a prepared test image to said person and asking if said person recognize the image,
   c) determining whether or not said person recognizes a presented test image or part thereof.

2. Method according to claim 1, wherein during step a) the transformation function can be applied repetitively on the whole image or selected parts thereof.

3. Method according to claim 1, wherein the transformation function may comprise different definitions dependent on the position (x,y).

4. Method for determining reproducibly if and to what extend visual features of a first test image produces also cognitive associations with visual features of a second test image to a person, which method comprises the following steps:
   a) preparing said first and second test images by applying for each of them a method for transforming images into test images by relocating image elements or groups of image elements by applying a n×m dimensional image element position transfer function $\psi^{n,m}(x,y)$ on n×m sections of test images, such that the relocated image elements or groups of image elements never cover each other, do not duplicatev each other, do not leave an open space and remain unchanged in respect to colour, coulor saturation and brightness
   b) presenting the first test image to said person,
   c) presenting the second test image to said person,
   d) determining from the responses of said person if cognitive association concerning the first and second images or parts thereof occurs.

5. Method according to claim 4, wherein during step a) the transformation function can be applied repetitively on the whole image or selected parts thereof.

6. Method according to claim 4, wherein the transformation function may comprise different definitions dependent on the position (x,y).

* * * * *